June 8, 1954 A. D. BOOTH 2,680,819

ELECTRICAL STORAGE DEVICE

Filed March 28, 1952 2 Sheets-Sheet 1

Inventor
ANDREW DONALD BOOTH

By

Attorney

Inventor
ANDREW DONALD BOOTH
By
Attorney

Patented June 8, 1954

2,680,819

UNITED STATES PATENT OFFICE 2,680,819

ELECTRICAL STORAGE DEVICE

Andrew Donald Booth, Fenny Compton, near Banbury, England, assignor to The British Tabulating Machine Company Limited, London, England, a British company Application March 28, 1952, Serial No. 279,232

Claims priority, application Great Britain January 3, 1952

12 Claims. (Cl. 307—88)

This invention relates to storage devices utilising the hysteresis characteristic of magnetic materials.

It is known to store data by employing a core of magnetic material having two or more coils wound thereon for input and output of data impulses, the conditions of operation being such that the core may assume either of the two magnetic states. In order to secure correct operation it is necessary that the magnetic material should have a "rectangular" hysteresis curve. The only materials known at the present time having this characteristic are costly and susceptible to mechanical and thermal shock.

It is an object of the present invention to provide an improved storage device utilising the hysteresis characteristic of magnetic material.

It is a further object of the invention to enable such storage elements to be made using a wider range of magnetic materials, particularly those not having a "rectangular" hysteresis characteristic.

According to the invention an electrical impulse operated magnetic storage device comprises a pair of similar input windings, a pair of similar shift windings, and a pair of similar output windings, one winding of each pair of windings linking with a first magnetic circuit having appreciable remanence, the other winding of each pair of windings linking with a second like magnetic circuit, the connections within each pair of windings being such that the voltages generated in the output windings by a change of flux produced by the shift windings are always in opposition and the changes of flux produced in the first magnetic circuit by the related input and shift windings are the same and the changes of flux produced in the second magnetic circuit by the related input and shift windings are opposite when the polarity of pulses applied to the input and shift windings are the same.

The invention will now be described by way of example, with reference to the accompanying drawings in which.

Storage devices of the general type referred to may be used for many purposes including a so-called shifting register. This use clearly illustrates the requirements of performance that must be met and therefore provides a convenient example. It will be appreciated, however, that the storage device of the invention is not limited to this use.

In computing machines, particularly in those employing the binary notation, it is convenient to have a storage unit comprising a chain of storage devices so arranged that data stored thereon may be successively shifted along the chain. Thus if the binary number 101,000 were stored on a chain of six devices, the stored number would become 010,100 after one shift to the right and 001,010 after two shifts. It is usual for the registration of a blank position to be the same as that of a binary "0" in known storage devices and this convention has been followed above. Such a storage unit is known as a "shifting register."

The general principle of operation of shifting registers is discussed in an article by A. D. Booth entitled "An Electronic Digital Computer" published in "Electronic Engineering" for December 1950.

Figure 1:
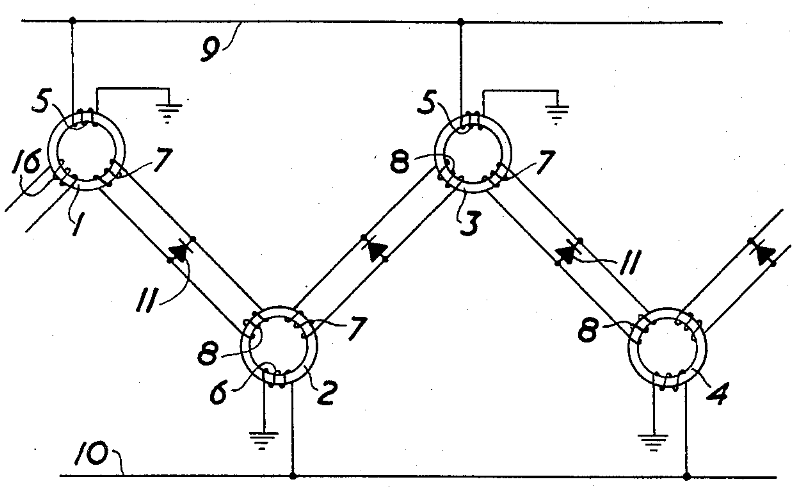
Figure 1 shows the circuit diagram of part of a shifting register of known type.
Figure 2:
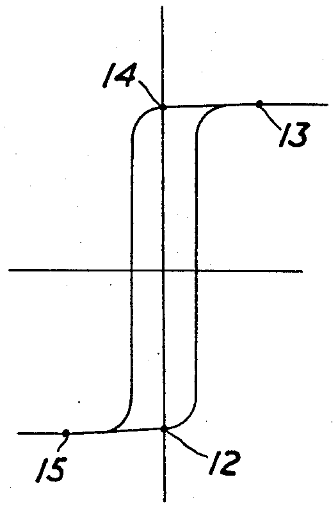
Figure 2 is a diagrammatic hysteresis curve relating to Figure 1.

Part of a shifting register of the type disclosed in the above mentioned publication is shown in Figure 1. Each of the rings 1, 2, 3 and 4 is a toroidal core of magnetic material having three coils wound thereon so that a closed magnetic circuit is formed in the core with which each of the three coils link. A typical hysteresis curve for a suitable core material such as Telcon H. C. R. alloy is shown in Figure 2, the magnetising field H being plotted on the horizontal axis and the magnetic induction B being plotted on the vertical axis. The "rectangular" shape of the curve is clearly shown.

Suppose that all the cores have an initial remanent field such that their magnetic state is represented by a point on the hysteresis curve referenced 12. A large voltage pulse is now applied to an input coil 16 wound on the toroid 1. The direction of the current in the coil is such that the resulting magnetic field drives the core into saturation to a point 13 on the hysteresis curve. When the pulse ceases the core will retain a remanent flux substantially equal to the saturation value and the state will then be represented by a point 14. This remanent flux is numerically equal to that existing before the pulse, but of opposite direction or sign. The magnetic states represented by the points 12 and 14 may be arbitrarily taken as representing a binary "0" and a binary "1" respectively.

In order to read out the "1" that has been registered by pulsing the coil 16, a pulse is applied on a line 9. A shift coil 5, wound on the core 1, is connected between the line 9 and earth. The pulse of current through this coil produces a flux which drives the core to saturation in the opposite sense, to a point 15, and the core then returns to the point 12. This large change of flux induces a voltage in an output coil 7 on the core 1.

If the shift coil 5 is pulsed when the core is registering "0," then the core is driven to the saturation point 15 from the point 12 and then returns to the point 12. Since the hysteresis curve is substantially "rectangular," the flux change produced is very small compared with that produced when the core is registering "1." Consequently the output coil 7 gives a large voltage output for a "1" registration and a smaller voltage output for a "0" registration, when the shift coil is pulsed. The difference between the output for a "0" and for a "1" is greater for a more "rectangular" hysteresis characteristic.

The output coil 7 is connected to an input coil 8 wound on the core 2, so that a large output from the coil 7 will produce a "1" registration on the core 2, in the same way as pulsing the coil 16 produced a "1" registration on the core 1.

An output coil 7 and a shift coil 6 are also wound on the core 2. The coil 7 is connected to an input coil 8 on the core 3 and the shift coil 6 is connected between a line 10 and earth. A pulse on the line 10 will now shift the "1" registration to the core 3 by inducing a large voltage in the output coil 7 of the core 2. The flux change in the core 2 will tend to induce a voltage in the input coil 8 of the core which would produce a flux change in the core 1. This is prevented by shunting each input and output coil link circuit by an asymetrically conducting device or rectifier 11 which presents a high impedance across the link to a pulse produced by the output coil and a low impedance to a pulse produced by the input coil.

The shift coils of the chain of cores are connected alternately to the lines 9 and 10 respectively and these lines receive pulses alternately. This prevents core 3, for example, receiving pulses on the input coil 8 and the shift coil 5 simultaneously.

It is inevitable that some energy loss takes place in transferring the registration from one core to the next. The effect of this must be annulled to ensure that the core receiving an impulse on the input coil is driven fully to saturation, that is to the point 14. This is done by having a smaller number of turns on the input coils 8 than on the output coils 7. Assuming the flux change produced by a pulse applied to the input coils of a storage device changes the magnetic saturation of the cores from one sense to the opposite, then the same flux change in the converse direction is produced by a pulse in the shift winding subject to any losses. The output coil having more turns than the input winding can therefore compensate for losses and supply a like pulse to the input of the next storage stage.

This method of stepping up the flux change is satisfactory when the core material has a "rectangular" hysteresis curve since the change of flux when a core registering "0" is pulsed is small.

Figure 4:
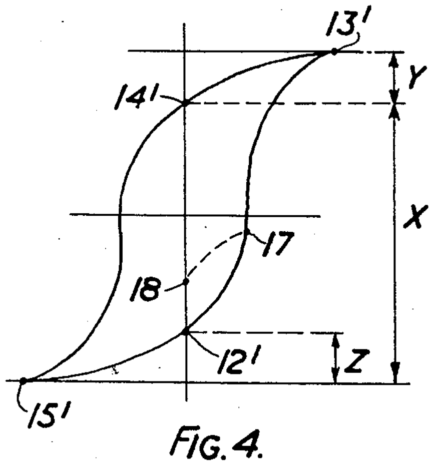
Figure 4 is a diagrammatic hysteresis curve relating to Figure 3.

The hysteresis curve for most magnetic materials is of the general shape shown in Figure 4. Points corresponding to those of Figure 2 are shown marked with a prime. For example, the "0" state is indicated by the point 12′. If a core employing such material is in the "0" state and receives a pulse on the shift coil, the magnetic state will change from point 12′ to point 15′ and back to point 12′. This represents an appreciable change in magnetic induction compared with that which occurs when going from the "1" state to the "0", that is, from point 14′ to point 15′ to point 12′. The flux change obtained on pulsing a core in the "0" state is increased by the difference in the number of turns on the input and output coils and is sufficient to displace the normal "0" state of the next core in the chain. For example, this latter core might go through the cycle from point 12′ to point 17 to point 18. A similar displacement takes place each time a shift occurs, so that after several shifts an original registration of "0" will be converted to a registration of "1" solely due to this effect.

Figure 3:
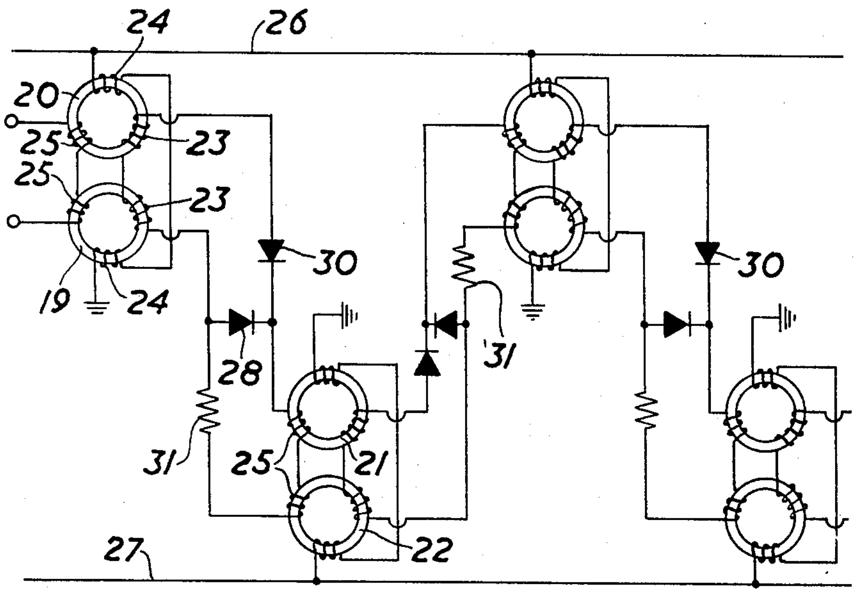
Figure 3 shows the circuit diagram of part of a shifting register utilising the storage device of the present invention.

It has been found that this cumulative effect is avoided by employing two toroids in a balanced circuit arrangement to form each storage device (Figure 3).

Each toroid core, such as 19, 20, 21 and 22, is made of any magnetic material having appreciable remanence. Preferably, the material is in the form of thin strip or alternatively powdered iron such as that known commercially as "Ferroxcube." This construction improves the high frequency response by reducing eddy current losses and so allows high speed operation.

The cores are each wound with an input coil 25, an output coil 23 and a shift coil 24 similar to those already described. The input coils and output coils of each pair of cores are connected in series aiding and the shift coils are connected in series opposition.

It will be assumed as before that the cores are all initially in the same state, for example that represented by point 12′ (Figure 4). A shift pulse is now applied on line 26. The core 20 will follow the bottom part of the curve to point 15′ and then return to point 12′. The shift coil 24 on the core 19, however, is connected in the opposite sense, so that this core will follow the right hand part of the curve to point 13′ and then to point 14′.

Thus the normal state of the cores of a pair, that is their state after a shift pulse has been applied, is with one at point 12′ and the other at point 14′. Similarly, a shift pulse on line 27 will set the two cores of each pair connected to this line in opposite states.

An input pulse of the correct polarity applied to the series-connected coils 25 on the cores 19 and 20 will bring the core 20 to the point 14′ at the end of the pulse. The core 19 was at this point before the pulse and will therefore remain unchanged.

When the next shift pulse occurs on the line 26, the state of core 20 will change from the point 14′ to the point 12′ through the point 15′. Simultaneously, the state of core 19 will change from point 14′ to point 13′ and back to point 14′.

The current produced in the series connected output coils 23 will be proportional to the net change of flux, that is, to the value $(x-y)$ This value is comparatively large for any material with appreciable remanence.

The output coils 23 of the cores 19 and 20 are connected to the input coils 25 of the cores 21 and 22, so that the registration of "1" will be transferred to these two latter cores.

A shift pulse on the line 27 will transfer the registration of "1" of the next pair of cores in this chain, in the manner already described. Thus a pair of cores such as 19 and 20 forms a single storage device corresponding to the single core devices of Figure 1.

The state of the cores 19 and 20 is now represented by the points 14′ and 12′ respectively. The effect of the next shift pulse is to change the state of the cores to 13′ and 15′ respectively and then back to normal. The net change of flux in this case is $(y-z)$. Since the two cores are similar, this value is theoretically zero. In practice, the core material may not be completely uniform and there may be slight differences in the windings, so that complete cancellation is not necessarily obtained, but the output is still very small compared with that obtained when a pair of cores registering "1" is pulsed. Furthermore, a resistance may be connected in shunt with the coil giving the higher output, the value being adjusted to bring the outputs to equality.

The following experimental results, which are quoted by way of example, show that the two core storage device not only allows the use of magnetic materials not having a "rectangular" hysteresis characteristic, but also provides a a larger ratio between the voltages obtained with a "1" and a "0" registration.

Thus for each core of a two core storage element:

| | Turns |
|---|---|
| Input coil | 75 |
| Output coil | 150 |
| Shift coil | 200 |

*Core material*, Ferroxcube 3C in a toroid of 2.5 cm. diameter and .25 sq. cm. cross section.

Shift pulse 100 milliamps with a duration of 100 micro-seconds. Under these conditions the output pulse for a "1" registration was 75 volts approximately and for a "0" registration was less than 1 volt. By contrast using the same number of turns and a single core of the same dimensions but employing Telcon "H. C. R." alloy, which has a "rectangular" hysteresis characteristic, the output for a "1" registration was 45 volts and for a "0" registration was 22 volts.

As in the case of the single core devices, a rectifier is shunted across the input and output coil link but the impedance of the input and output coils may be of the same order of magnitude as the forward resistance of rectifiers 28 shunted across the link circuit. Under these conditions greatly improved discrimination between wanted and unwanted pulses is obtained by adding a series rectifier 30 between the output coil and the shunt rectifier and a series resistance 31 between the input coil and the shunt rectifier.

Using a rectifier 28 having a forward resistance of approximately five ohms, with the coil dimensions already quoted, the resistance 31 may conveniently have a value of ten to fifteen ohms.

With the two core storage element it is also possible to obtain a large output pulse for a "0" registration, but of opposite sign to that obtained with a "1" registration. With the single core element this is not possible since it cannot assume the three conditions necessary to represent a "1," a "0" or no registration.

Considering the pair of cores 19 and 20 once more, if an input pulse of opposite polarity to that used to register "1" is applied to the input coils 25, the core 19 will be brought to the state represented by point 12′ at the end of the pulse. Both cores are now in this state and a shift pulse will bring core 19 back to the point 14′, so that the net flux change will be $((x-z+y)-z)$. Since $y$ and $z$ are substantially equal this is approximately equal to $(x-y)$. Hence the output in this case will equal that from a "1" registration but will be of opposite polarity, since the net flux change is in the opposite sense. Thus two pulses of opposite polarity may be used to represent "1" and "0" respectively and the state previously referred to as a "0" registration, that is absence of a pulse, may be used to indicate no registration.

Figure 5:
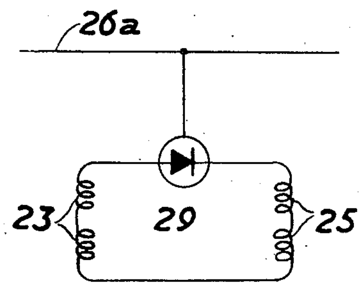
Figure 5 shows an alternative form of coupling between storage devices.

When using pulses of opposite polarity, the series and shunt rectifiers already described can no longer be used to prevent feed back. These rectifiers are removed and a gating device, indicated diagrammatically by 29 (Figure 5) is connected in series with the input and output coil link circuit. The device 29 may be of any form which allows an effective connection between the coils 23 and 25 only when a shift pulse occurs.

A device having this property using two saturable magnetisable cores in a balance arrangement is described in the article by A. D. Booth already referred to.

Preferably the gating devices are controlled by pulses which overlap the shift pulses in time, to ensure that they are fully operative for the duration of the pulses produced by the output coils. Thus the first and third gating devices are controlled by pulses on a line 26*a* which overlap the pulses on the line 26, whilst the second device is controlled by pulses which overlap those on the line 27.

Although the cores of the storage elements have been described throughout as being of toroidal form, this is not essential provided that the core shape is such that all the three coils are closely linked to the magnetic circuit of the core. As is well known, a toroidal core does provide high coupling as well as a low external field when the coils are energized.

It is not essential that the coils of the two cores of a storage device should be connected in the manner already described. For example, the input and output coils may be connected with the coils of each pair in series opposition and the pair of shift coils are then connected in series aiding. The state of the two cores after a shift pulse will be represented by the point 12′ and an input pulse will change the state of one of the cores to the point 14′.

The criteria determining the methods of connection are that, firstly, a shift pulse must bring the two cores to the same state and the input must bring them to opposite states, or the converse of this. Secondly, the output coils must be connected so that the voltages induced in them by a shift pulse tend to cancel each other.

These criteria show that other connections may be used. For example, the shift coils may be connected in parallel instead of in series.

Furthermore, these criteria may still be met if the two cores are joined to form one core of a figure-of-eight shape and the series aiding shift coils are both wound on the part of the core common to both magnetic circuits. Alternatively, the input coils may be wound on the common part of the core.

What I claim is:

1. An electrical impulse operated magnetic storage device comprising a pair of similar input windings, a pair of similar shift windings, and a pair of similar output windings, one winding of each pair of windings linking with a first magnetic circuit having appreciable remanence, the other winding of each pair of windings linking with a second like magnetic circuit, the connections within each pair of windings being such that the voltages generated in the output windings by a change of flux produced by the shift windings are always in opposition and the changes of flux produced in the first magnetic circuit by the related input and shift windings are the same and the changes of flux produced in the second magnetic circuit by the related input and shift windings are opposite when the polarities of pulses applied to the input and shift windings are the same.

2. Apparatus as claimed in claim 1, in which the pairs of windings are disposed on a core such that part of the core is common to both magnetic circuits and the pair of shift windings are disposed on said common part.

3. Apparatus as claimed in claim 1, in which the pairs of windings are disposed on a core such that part of the core is common to both magnetic circuits and the pair of input windings are disposed on said common part.

4. Apparatus as claimed in claim 1, in which the material through which the two magnetic circuits pass has a remanence value substantially less than the saturation value.

5. An electrical impulse operated magnetic storage device comprising a pair of similar input windings, a pair of similar output windings, a pair of similar shift windings, a first core of a magnetic material having appreciable remanence, on which core is wound one winding of each pair of windings, and a second like core on which is wound the other winding of each pair of windings, the pair of input windings being connected in series opposition, the pair of output windings being connected in series opposition and the pair of shift windings being connected in series aiding.

6. An electrical impulse operated magnetic storage device comprising a pair of similar input windings, a pair of similar output windings, a pair of similar shift windings, a first core of a magnetic material having appreciable remanence, on which core is wound one winding of each pair of windings and a second like core on which is wound the other winding of each pair of windings, the pair of input windings being connected in series aiding, the pair of output windings being connected in series aiding and the pair of shift windings being connected in series opposition.

7. Apparatus as claimed in claim 5, in which the core material has a remanence value substantially less than the saturation value.

8. Storage means of the shifting register type comprising a plurality of storage devices as claimed in claim 1 arranged in chain formation, the pair of output windings of one device being connected to the pair of input windings of the next device in the chain, an asymmetrically conductive device connected in shunt with each pair of input windings except those of the first device and means for pulsing alternately the pairs of shift windings of adjacent storage devices, pulses of one polarity only being applied to the pair of input windings of the first device in the chain.

9. Storage means of the shifting register type comprising a plurality of storage devices as claimed in claim 1 arranged in chain formation, the pair of output windings of each device being connected to the pair of input windings of the next device in the chain through an asymmetrically conductive device and a resistance, a second asymmetrically conductive device in shunt with each pair of input windings, except those of the first device, and the related resistance in series and means for pulsing alternately the pairs of shift windings of adjacent storage devices, pulses of one polarity only being applied to the pair of input windings of the first device in the chain.

10. Storage means of the shifting register type comprising a plurality of storage devices as claimed in claim 1 arranged in chain formation, the pair of output windings of each device being connected to the pair of input windings of the next device in the chain through a gating device, means for pulsing alternately the pairs of shift windings of adjacent storage devices, and means for making the gating devices operative to allow voltages generated by the output windings to be applied to the input windings.

11. An electrical impulse operated magnetic storage device as claimed in claim 6, in which the core material has a remanence value substantially less than the saturation value.

12. A storage device for data represented by electrical impulses comprising a pair of cores of magnetic material having appreciable remanence, the presence and absence of stored data being represented respectively by first and second combinations of static magnetic states of the two magnetic cores, on each core a data impulse input winding, a shift winding and an output winding, each pair of similar windings of said cores being connected for the induction, when a pulse is applied to the pair of said shift windings, of cancelling voltages in said output windings when the cores are in the said second combination of states, and of non-cancelling voltages in said output windings when the cores are in the first combination of states.

No references cited.